(12) United States Patent
Loeffler et al.

(10) Patent No.: US 8,733,664 B2
(45) Date of Patent: May 27, 2014

(54) APPARATUS AND METHOD FOR SUPPLYING AN RFID COMPONENT WITH ENERGY

(75) Inventors: Andreas Loeffler, Erlangen (DE); Uwe Wissendheit, Erlangen (DE); Dina Kuznetsova, Wladimir (RU); Heinz Gerhaeuser, Waischenfeld (DE)

(73) Assignees: Fraunhofer-Gesellschaft zur Foerderung der angewandten Forschung e.V., Munich (DE); Friedrich-Alexander Universitaet Erlangen-Nuernberg, Erlangen (DE)

(*) Notice: Subject to any disclaimer, the term of this patent is extended or adjusted under 35 U.S.C. 154(b) by 125 days.

(21) Appl. No.: 13/283,753

(22) Filed: Oct. 28, 2011

(65) Prior Publication Data
US 2012/0132710 A1    May 31, 2012

Related U.S. Application Data

(63) Continuation of application No. PCT/EP2010/055851, filed on Apr. 29, 2010.

(30) Foreign Application Priority Data

Apr. 30, 2009  (DE) .................. 10 2009 019 657

(51) Int. Cl.
    G06K 19/06    (2006.01)
    G06K 7/00     (2006.01)
    G06K 7/08     (2006.01)

(52) U.S. Cl.
    USPC ............................ 235/492; 235/439; 235/451

(58) Field of Classification Search
    USPC .......................................... 235/439, 451, 492
    See application file for complete search history.

(56) References Cited

U.S. PATENT DOCUMENTS

| 5,519,729 | A  | * | 5/1996  | Jurisch et al. ................. 375/259 |
| 6,466,126 | B2 | * | 10/2002 | Collins et al. ................. 340/333 |
| 7,786,867 | B2 | * | 8/2010  | Hamel et al. ................ 340/572.1 |
| 2004/0113790 | A1 |   | 6/2004  | Hamel et al. |
| 2006/0170553 | A1 | * | 8/2006  | Bierach ..................... 340/572.4 |
| 2007/0153561 | A1 |   | 7/2007  | Mickle et al. |
| 2007/0279225 | A1 |   | 12/2007 | Pellerano et al. |
| 2008/0079396 | A1 |   | 4/2008  | Yamazaki et al. |

(Continued)

FOREIGN PATENT DOCUMENTS

WO    93/20531 A1    10/1993

OTHER PUBLICATIONS

English translation of Official Communication issued in corresponding International Application PCT/EP2010/055851, mailed on Nov. 3, 2011.

(Continued)

*Primary Examiner* — Thien M Le
*Assistant Examiner* — April Taylor
(74) *Attorney, Agent, or Firm* — Keating & Bennett, LLP

(57) ABSTRACT

An apparatus for supplying an RFID component with energy includes an antenna and an energy store. The energy store stores energy induced into the antenna by an alternating electromagnetic field during a first time interval. In addition, the energy store supplies the RFID component with stored energy in order to maintain its functionality during a later, second time interval if an energy induced by an alternating electromagnetic field during the later, second time interval is not sufficient for supplying the RFID component.

28 Claims, 10 Drawing Sheets

(56) References Cited

U.S. PATENT DOCUMENTS

| | | | |
|---|---|---|---|
| 2008/0093463 A1* | 4/2008 | Chang et al. | 235/492 |
| 2008/0093935 A1 | 4/2008 | Saito et al. | |
| 2009/0102296 A1 | 4/2009 | Greene et al. | |
| 2011/0084149 A1* | 4/2011 | Faith et al. | 235/492 |

OTHER PUBLICATIONS

Official Communication issued in International Patent Application No. PCT/EP2010/055851, mailed on Jul. 2, 2010.

Yeager et al., "Wirelessly-Charged UHF Tags for Sensor Data Collection," 2008 IEEE International Conference on RFID, Apr. 16-17, 2008, pp. 320-327, Las Vegas, Nevada.

Sample et al., "Design of an RFID-Based Battery-Free Programmable Sensing Platform," IEEE Transactions on Instrumentation and Measurement, vol. 57, No. 11, Nov. 2008.

Kocer et al., "Wireless, Remotely Powered Telemetry in 0.25 μm CMOS," Wireless Integrated Microsystems Engineering Research Center (WIMS-ERC), 4 pages, 2004.

* cited by examiner

APPARATUS AND METHOD FOR SUPPLYING AN RFID COMPONENT WITH ENERGY

CROSS-REFERENCE TO RELATED APPLICATIONS

This application is a continuation of copending International Application No. PCT/EP2010/055851, filed Apr. 29, 2010, which is incorporated herein by reference in its entirety, and additionally claims priority from German Application No. 102009019657.9-32, filed Apr. 30, 2009, which is also incorporated herein by reference in its entirety.

Embodiments in accordance with the invention relate to radio-frequency identification (RFID) systems, and in particular to an apparatus and a method for supplying an RFID component with energy as well as to an apparatus and a method for detecting a measurand.

The field of application of radio/high-frequency identification systems relates to, e.g., systems for identifying objects and living beings by means of RFID technology or transponder technology. A further field of application includes wireless reading of data, such as sensor data, for example, by means of RFID technology.

BACKGROUND OF THE INVENTION

Several systems for wireless transmission of (sensor) data by means of RFID technology have been known. For example, transponder ICs (integrated circuits) exist which may capture analog data of an external sensor. Said sensor data may be read out via RFID standard protocols while using an RFID reader. Partly, this involves an external voltage source (e.g. battery) if the system is to fetch the sensor data at specified times. If no external voltage source is used, the sensor data can only be established and/or read out at those times when an RFID reader is within reach to supply the system with energy. Some available systems exhibit predefined integrated sensors (e.g. only temperature). Also, in many systems, the number of the sensors to be connected is limited (e.g. three at the most). In addition, in most systems only such sensors can be employed which feed back analog measurement values. Said analog values are then converted to digital data within the system (transponder system).

Thus, utilization of external voltage supplies such as batteries is often the case in known systems. In addition, there is a limited number of sensor inputs of the system, e.g. a restriction to one sensor. Connection of external sensors is limited to a specific type of connection, e.g. to purely analog sensor input signals or only SPI (serial peripheral interface). Also, sensor data can only be determined at those times at which an RFID reader is present, since said reader makes an alternating magnetic field available to the system as an energy source. Moreover, existing systems are mostly specified to only one sensor type (e.g. temperature).

SUMMARY

According to an embodiment, an apparatus for supplying an RFID component with energy may have: an antenna; an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component; and a control module configured to generate a carrier signal so as to provide an energy, which is provided by the energy store for supplying the RFID component, to the RFID component at an antenna interface of the RFID component on the basis of the generated carrier signal.

According to another embodiment, an apparatus for supplying an RFID component with energy may have: an antenna; an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component; and an energy management device configured to determine an energy state parameter of the energy store, and configured to provide the energy state parameter to the RFID component for storage or transmission to a receiver.

According to another embodiment, an apparatus for detecting a measurand may have: an RFID component; an antenna; an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component; a data detection module configured to detect the measurand during the second time interval, and configured to provide the measurand to the RFID component for storage or transmission to a receiver, said energy store being configured to supply the data detection module with energy during the detection of the measurand; and a control module configured to store the measurand into the RFID component via an antenna interface of the RFID component, or configured to generate a carrier signal so as to provide an energy, which is provided by the energy store for supplying the RFID component, to the RFID component at an antenna interface of the RFID component on the basis of the generated carrier signal.

According to another embodiment, an apparatus for detecting a measurand may have: an RFID component; an antenna; an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component; a data detection module configured to detect the measurand during the second time interval, and configured to provide the measurand to the RFID component for storage or transmission to a receiver, said energy store being configured to supply the data detection module with energy during the detection of the measurand; and an energy management device configured to determine an energy state parameter of the energy store, and configured to provide the energy state parameter to the RFID component for storage or transmission to a receiver.

According to another embodiment, an RFID reader for providing energy state information of an RFID component may have: an energy state information provider configured to provide the energy state information of the RFID component on the basis of an energy state parameter received by the RFID component.

According to another embodiment, a method of supplying an RFID component with energy may have the steps of: storing energy induced into an antenna by an alternating electromagnetic field during a first time interval; generating a carrier signal so as to provide stored energy to the RFID component at an antenna interface of the RFID component on the basis of the generated carrier signal; and supplying the RFID component with stored energy in order to maintain its functionality during a later, second time interval if an energy induced by an alternating electromagnetic field during the later, second time interval is not sufficient for supplying the RFID component.

According to another embodiment, a method of supplying an RFID component with energy may have the steps of: storing energy induced into an antenna by an alternating electromagnetic field during a first time interval; supplying the RFID component with stored energy in order to maintain its functionality during a later, second time interval if an energy induced by an alternating electromagnetic field during the later, second time interval is not sufficient for supplying the RFID component; determining an energy state parameter of the energy store; and providing the energy state parameter to the RFID component for storage or transmission to a receiver.

According to another embodiment, a method of detecting a measurand may have the steps of: storing energy induced into an antenna by an alternating electromagnetic field during a first time interval; supplying the RFID component with stored energy in order to maintain its functionality during a later, second time interval if an energy induced by an alternating electromagnetic field during the later, second time interval is not sufficient for supplying the RFID component; detecting the measurand by means of a data detection module; providing the data detection module with stored energy during the detection of the measurand; and storing the measurand into the RFID component via an antenna interface of the RFID component, or generating a carrier signal so as to provide stored energy to the RFID component at an antenna interface of the RFID component on the basis of the generated carrier signal.

According to another embodiment, a method of detecting a measurand may have the steps of: storing energy induced into an antenna by an alternating electromagnetic field during a first time interval; supplying the RFID component with stored energy in order to maintain its functionality during a later, second time interval if an energy induced by an alternating electromagnetic field during the later, second time interval is not sufficient for supplying the RFID component; detecting the measurand by means of a data detection module; providing the data detection module with stored energy during the detection of the measurand; determining an energy state parameter of the energy store; and providing the energy state parameter to the RFID component for storage or transmission to a receiver.

Another embodiment may have a computer program including a program code for performing the method of supplying an RFID component with energy, which method may have the steps of: storing energy induced into an antenna by an alternating electromagnetic field during a first time interval; generating a carrier signal so as to provide stored energy to the RFID component at an antenna interface of the RFID component on the basis of the generated carrier signal; and supplying the RFID component with stored energy in order to maintain its functionality during a later, second time interval if an energy induced by an alternating electromagnetic field during the later, second time interval is not sufficient for supplying the RFID component, when the computer program runs on a computer or microcontroller.

Another embodiment may have a computer program including a program code for performing the method of supplying an RFID component with energy, which method may have the steps of: storing energy induced into an antenna by an alternating electromagnetic field during a first time interval; supplying the RFID component with stored energy in order to maintain its functionality during a later, second time interval if an energy induced by an alternating electromagnetic field during the later, second time interval is not sufficient for supplying the RFID component; determining an energy state parameter of the energy store; and providing the energy state parameter to the RFID component for storage or transmission to a receiver, when the computer program runs on a computer or microcontroller.

Another embodiment may have a computer program including a program code for performing the method of detecting a measurand, which method may have the steps of: storing energy induced into an antenna by an alternating electromagnetic field during a first time interval; supplying the RFID component with stored energy in order to maintain its functionality during a later, second time interval if an energy induced by an alternating electromagnetic field during the later, second time interval is not sufficient for supplying the RFID component; detecting the measurand by means of a data detection module; providing the data detection module with stored energy during the detection of the measurand; and storing the measurand into the RFID component via an antenna interface of the RFID component, or generating a carrier signal so as to provide stored energy to the RFID component at an antenna interface of the RFID component on the basis of the generated carrier signal, when the computer program runs on a computer or microcontroller.

Another embodiment may have a computer program including a program code for performing the method of detecting a measurand, which method may have the steps of: storing energy induced into an antenna by an alternating electromagnetic field during a first time interval; supplying the RFID component with stored energy in order to maintain its functionality during a later, second time interval if an energy induced by an alternating electromagnetic field during the later, second time interval is not sufficient for supplying the RFID component; detecting the measurand by means of a data detection module; providing the data detection module with stored energy during the detection of the measurand; determining an energy state parameter of the energy store; and providing the energy state parameter to the RFID component for storage or transmission to a receiver, when the computer program runs on a computer or microcontroller.

Embodiments in accordance with the invention are based on the core idea that energy induced into the antenna is stored. The stored energy may then be utilized for supplying the RFID component at any later point in time when no alternating electromagnetic field with a sufficient energy density is present to induce a sufficient amount of energy to supply the RFID component. In this manner, the RFID component can also be operated when, e.g., no reader is close by that would supply the RFID component by means of its alternating electromagnetic field. Thus, self-sufficient operation of the RFID component may be enabled.

BRIEF DESCRIPTION OF THE DRAWINGS

Embodiments of the present invention will be detailed subsequently referring to the appended drawings, in which.

In the present application, identical reference numerals are sometimes used for objects and functional units having identical or similar functional properties.

DETAILED DESCRIPTION OF THE INVENTION

Figure 1A:
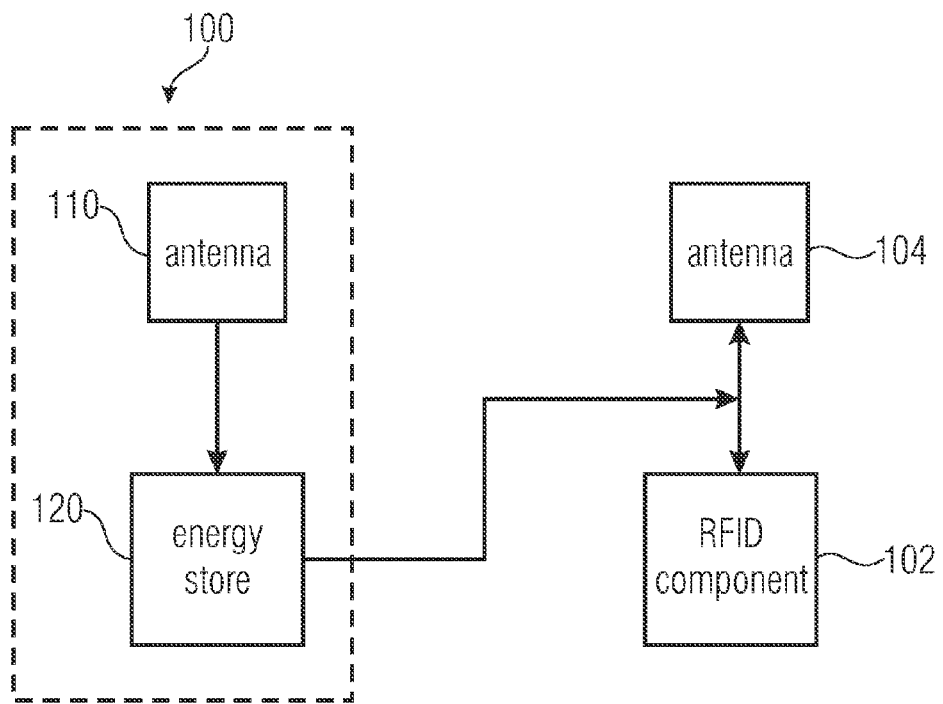
FIGS. 1a, 1b show block diagrams of an apparatus for supplying an RFID component with energy.
Figure 1B:
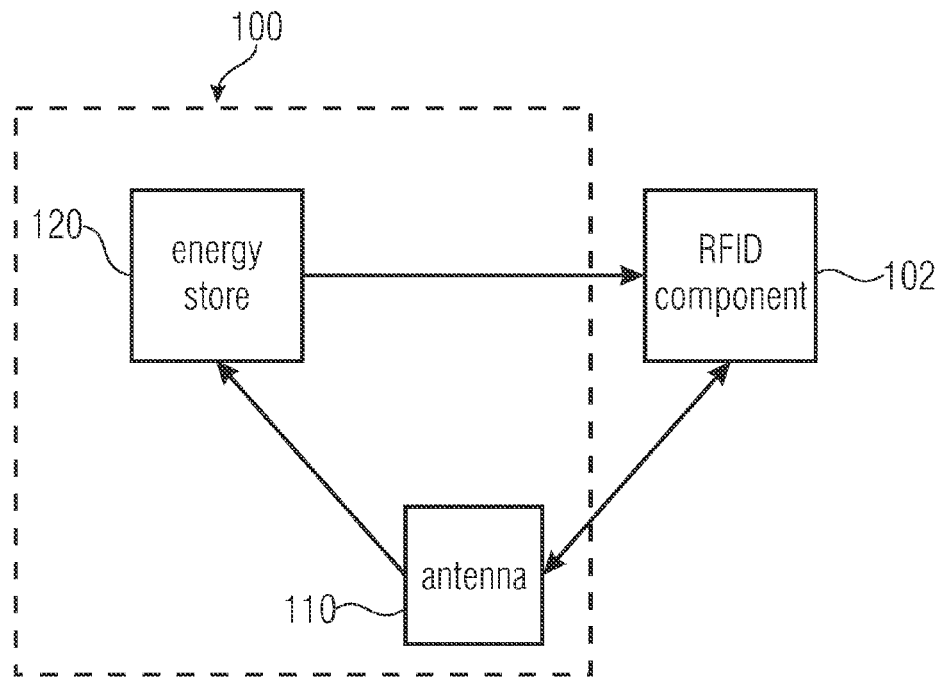

FIGS. 1a and 1b show block diagrams of an apparatus 100 for supplying an RFID component 102 with energy, in accordance with an embodiment of the invention. The apparatus 100 includes an antenna 110 and an energy store 120. The antenna 110 is connected to the energy store 120. The energy store 120 stores energy induced into the antenna 110 by an alternating electromagnetic field during a first time interval. In addition, the energy store 120 supplies the RFID component 102 with energy for maintaining its functionality during a later, second time interval if energy induced by an alternating electromagnetic field during the later, second time interval is not sufficient for supplying the RFID component 102.

The energy store 120 may be connected to the RFID component 102 so as to supply the RFID component 102.

The RFID component 102 may be provided with an antenna 104 of its own, as is shown in FIG. 1a, so as to be supplied with energy by a reader or receiver, to receive data and/or to transmit data to the receiver or to the reader, for example. Alternatively, the RFID component 102, as is shown in FIG. 1b, may be connected to the antenna 110 of the apparatus 100 for energy supply purposes so as to thereby be supplied with energy by a reader or a receiver, to receive data and/or to transmit data to the receiver or to the reader, for example.

In other words, the system may include a further antenna 104 into which energy may be induced to directly supply the RFID component 102 and into which insufficient energy is induced, during the second time interval, to guarantee energy supply of the RFID component.

The alternating electromagnetic field relates, e.g., both to an alternating magnetic field, which is used, for example, for RFID components with load modulation, and to an electromagnetic wave, which is used, for example, for RFID components that are based on back-scattering. In other words, the alternating electromagnetic field relates to any form of electromagnetic fields via which energy can be induced or coupled into an RFID component in a non-contacting manner.

By means of the energy store 120, the functionality of the RFID component 102 may be maintained even when no device, such as a reader, is located sufficiently close to the RFID component 102 to generate a sufficiently strong alternating electromagnetic field to supply the RFID component inductively or electromagnetically. Maintenance of the functionality may relate to, e.g., a time interval directly following a supply termination time wherein the energy density of the alternating electromagnetic field falls below a supply threshold at which sufficient energy for supplying the RFID component 102 is no longer induced. However, maintenance of the functionality above all relates to a time interval which starts at any point in time following the supply termination time. In this manner, the RFID component 102 may be put into operation at any time irrespective of the presence of a reader or another source of an alternating electromagnetic field. For example, putting into operation of the RFID component 102 may also be realized at constant or random time intervals. In other words, the first time interval and the second time interval may directly succeed each other or may have a period of time between them.

In this manner, for example, it is possible not only to guarantee that an operation that has started will be reliably terminated at that point in time at which the alternating electromagnetic field is no longer sufficient to supply the RFID component 102, but it is also possible, above all, to perform further operations or functions at this or at a later point in time.

Due to the maintenance of the functionality of the RFID component 102, the RFID component 102 may be held in a standby state, for example, and may be put into operation as and when necessitated, irrespective of the presence of a sufficiently strong alternating electromagnetic field. Said standby state may be maintained for a time period of several second, several minutes, several hours or even several days, for example, depending on the type and size of the energy store.

The energy store 120 may be realized, among other things, as a capacitor or accumulator, for example. The type and dimensioning of the energy store 120 may be adapted to the requirements of the application.

The RFID component 102, also referred to as RFID tag, RFID module or RFID circuit, may be a conventional RFID component, for example, as is shown in FIG. 1a, which comprises no dedicated interface for connecting the apparatus 100 for providing energy supply. In this case, the apparatus 100 for providing energy supply may be designed to be connected to the RFID component 102 together with the antenna of the RFID component 102. In other words, the apparatus 100 for providing energy supply may utilize the antenna connections of the RFID component 102, the RFID component 102, as has already been described, also utilizing the antenna 110 of the apparatus 100 for providing energy supply, or comprising an antenna 104 of its own. Alternatively, the RFID component 102 may comprise, as is indicated in FIG. 1b, an interface of its own, via which the RFID component 102 may be supplied and to which the apparatus 100 for providing energy supply may be connected.

Figure 2:
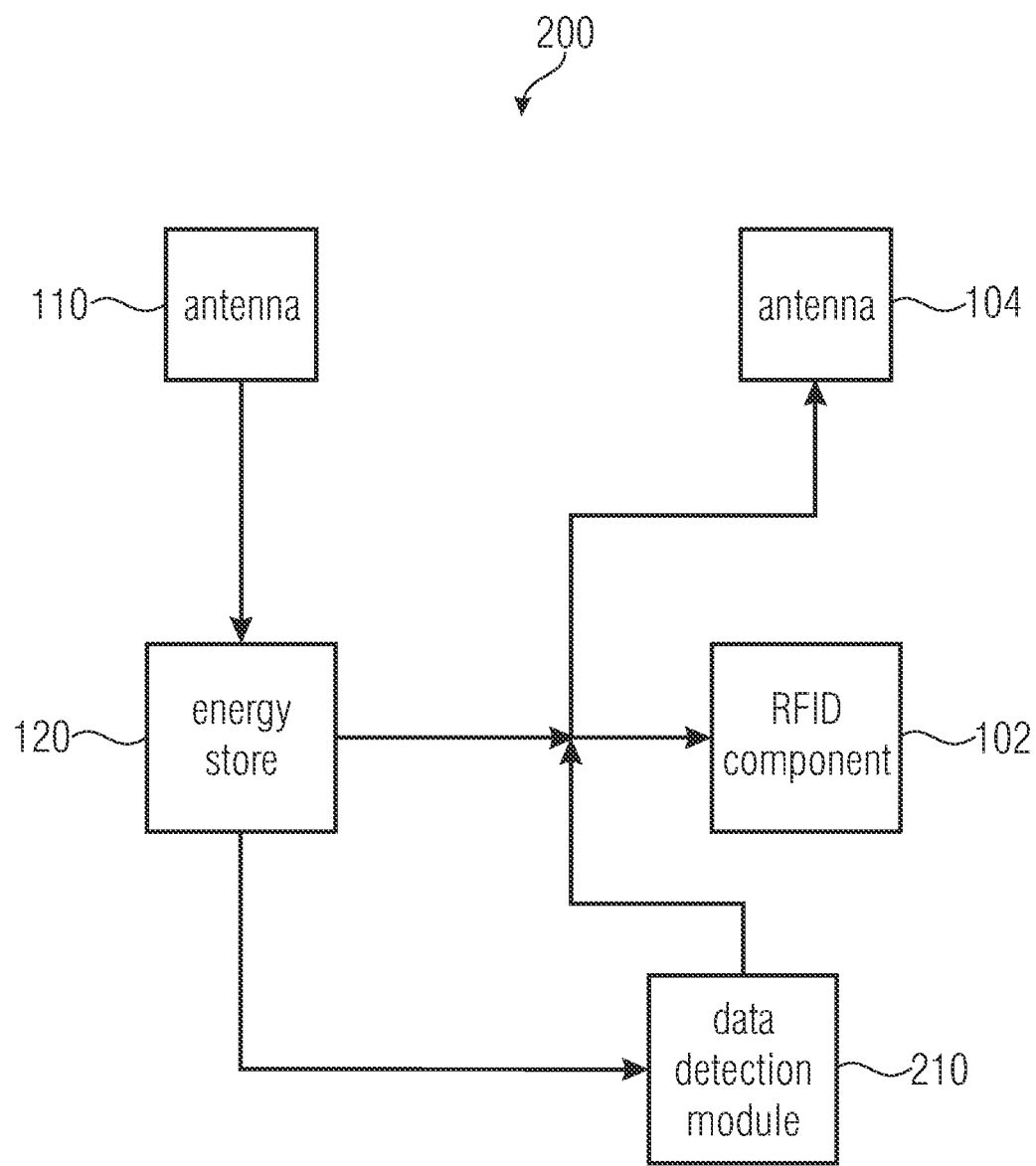
FIG. 2 shows a block diagram of an apparatus for detecting a measurand.

FIG. 2 shows a block diagram of an apparatus 200 for detecting a measurand in accordance with an embodiment of the invention. The apparatus 200 includes an RFID component 102, an antenna 110, an energy store 120, and a data detection module 210. The antenna 110 is connected to the energy store 120, the energy store 120 is connected to the RFID component 102 and to the data detection module 210, and the data detection module 210 is connected to the RFID component 102.

The energy store 120 stores energy induced into the antenna 110 by an alternating electromagnetic field during a first time interval. In addition, the energy store 120 supplies the RFID component 102 with energy for maintaining its functionality during a later, second time interval if an energy induced by an alternating electromagnetic field during the later, second time interval is not sufficient for supplying the RFID component 102. The data detection module 210 detects the measurand during the second time interval and provides the measurand to the RFID component 102 for storage or transmission to a receiver. The energy store 120 supplies the data detection module 210 with energy while during detection of the measurand.

As was already described in FIG. 1a and as was also depicted in FIG. 2, the RFID component 102 may have an antenna 104 of its own, or, as was already described in FIG. 1b, may utilize the antenna 110 of the energy store 120 to receive data, transmit data or be supplied with energy given a sufficiently strong alternating electromagnetic field.

Since the RFID component 102 and the data detection module 210 are supplied with energy by the energy store 120, measurands may be detected by the data detection module 210 and be provided to the RFID component 102 even if no reader or other source of an alternating electromagnetic field provides an alternating electromagnetic field having sufficient energy density to ensure energy supply. In this manner, any measurands detected may be stored, e.g., by the RFID component 102 and be read out by means of a reader at a later point in time.

The data detection module 210 may include, for example, one or several sensors, e.g. for temperature, humidity, pressure or acceleration, a microphone, an image sensor and/or a timer.

The alternating electromagnetic field in the first time interval may comprise a higher energy density than the alternating electromagnetic field in the second time interval. However, this need not necessarily be the case since an alternating field having a lower energy density may be sufficient to charge the energy store 120, while not being sufficient, however, to supply the RFID component 102.

Some embodiments in accordance with the invention relate to an apparatus comprising an energy management device. The energy management device may determine an energy state parameter of the energy store and provide it to the RFID component for storage or transmission to a receiver. The energy state parameter may be a charging voltage or a charging current of the energy store, for example (e.g. the voltage between the electrodes if the energy store is a capacitor) or any other constant reflecting the state of charge and/or the energy remaining within the energy store. This value or any variable derived therefrom may be transmitted to a reader or be read out by a reader, for example, and in this manner it is possible to ascertain, e.g., how long the RFID component or the entire apparatus (e.g. RFID component, data detection module, energy management device) can operate self-sufficiently once the reader is removed.

The energy management device may supply the RFID component with energy via an antenna interface, for example. In other words, the energy management device may simulate energy supply of the RFID component by a reader via the antenna of the RFID component. To this end, the antenna interface of the RFID component may be connected to the antenna of the RFID component and of the energy management device. Thus, the RFID module may be supplied with energy either by a reader or the energy management means and the energy store connected thereto.

In addition, the energy management device may be configured to monitor and to control the supply of the RFID component and to activate, for example, supply on the part of the energy store. In addition, the energy management device may take on DC/DC conversion so as to provide a constant voltage and to utilize as much energy from the energy store as possible.

In known systems, the superordinated processing system (e.g. the reader or a host system or mainframe computer connected thereto) does not know the energy state of the system, i.e. one does not know how long the sensor system will still be able to operate. This problem can be solved by the energy management device described.

Some embodiments in accordance with the invention relate to an apparatus comprising a control module. The control module may control storage of data within the RFID component. For example, measurands of a data detection module that have been detected by the control module may be stored within the RFID component. To this end, the control module may be directly connected to the antenna of the RFID component (or to the antenna of the apparatus for providing energy supply if same is used by the RFID component) and thus trigger (communicate with) the RFID component via the antenna interface. In other words, the control module may simulate a reader via the antenna interface of the RFID component and thus write data into the memory of the RFID component. To this end, the antenna interface of the RFID component may be connected to the antenna of the RFID component and control module. Thus, the RFID module may be triggered either by a reader or the control module. For this purpose, the control module may use the same protocol and/or or the same (frequency) modulation as a reader.

In addition, the control module may generate a carrier signal, for example, to provide the RFID component with energy provided by the energy store or the energy management device for supplying the RFID component, at an antenna interface of the RFID component, on the basis of the carrier signal generated. In this manner, the control module may supply the RFID module with energy from the energy store just as if a reader were close by. For RFID components which have only the antenna interface for energy supply purposes, the energy may thus be coupled in via the high-frequency carrier. Carrier generation may be performed by the control module (or directly by the energy management device). For RFID components having additional supply connections (e.g. for connecting a battery), a voltage of the energy management may also be directly connected to the RFID component.

The control module may also be separated as well as be integrated into the energy management, for example, and the data detection module may already have been incorporated into the RFID component (e.g. transponder with integrated sensor).

Figure 3:
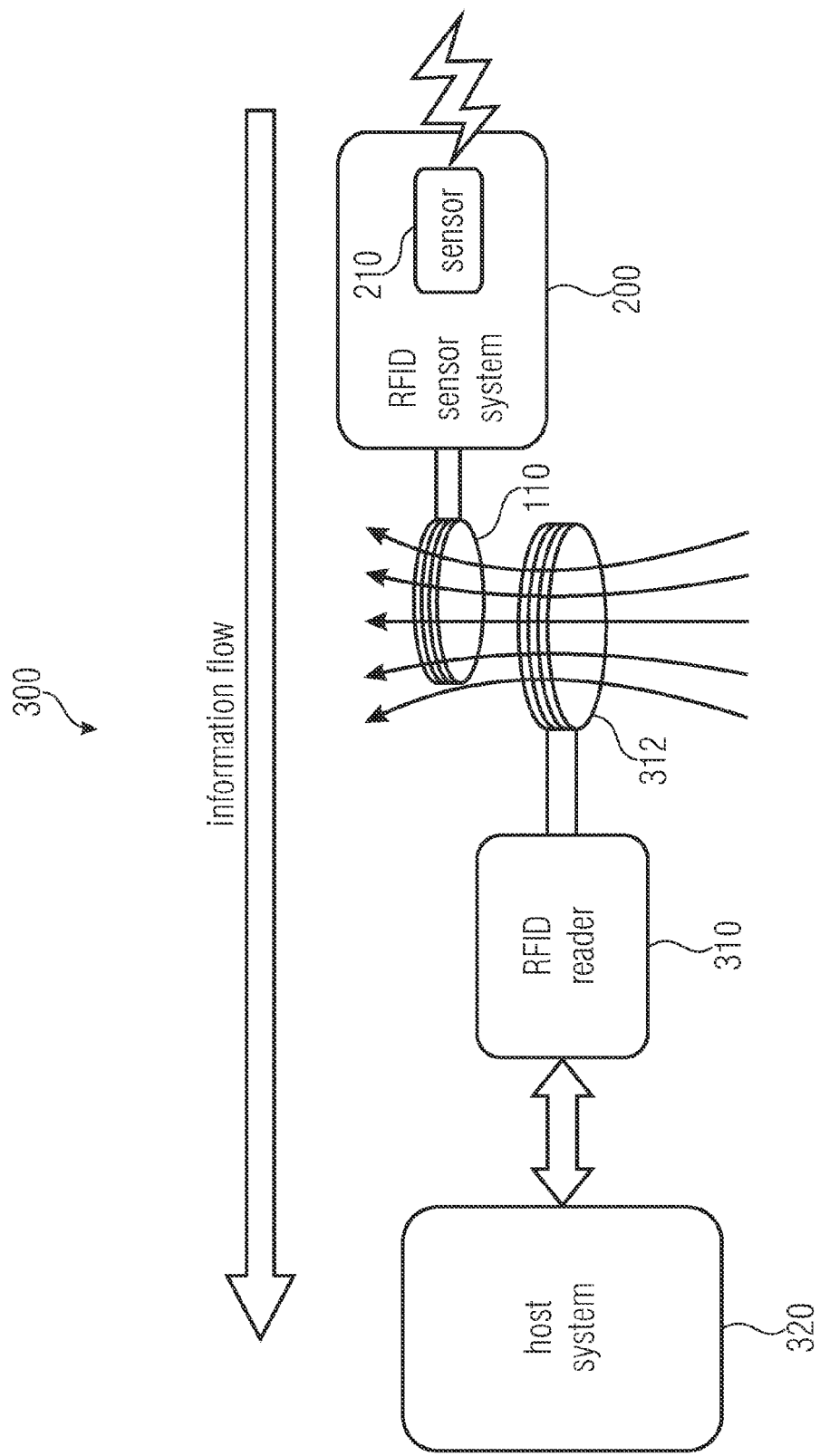
FIG. 3 shows a schematic representation of an RFID sensor system.

FIG. 3 shows a schematic representation of an overall system 300 comprising an RFID sensor system 200 in accordance with an embodiment of the invention. The overall system 300 includes an RFID sensor system 200 comprising, inter alia, the antenna 110 and the data detection module 210, an RFID reader 310 comprising an antenna 312 and a host system 320. The information flow is directed from the RFID sensor system 200 to the RFID reader 310, and from there to the host system 320. The RFID reader 310 may be connected to the host system 320, and the RFID reader 310 may exchange data with the RFID sensor system via an alternating electromagnetic field. In addition, it is via the alternating field that the RFID reader 310 may supply the RFID sensor system 200 with energy and may charge the energy store of the RFID sensor system 200.

In other words, contemplation of an entire system for detecting and transmitting (sensor) data includes several units.

It is in a temporarily autonomous manner that the RFID sensor system 200 may capture (sensor) data and write said data (internally) into the memories of one or more conventional standardized RFID components or RFID transponders, which may be read out by means of RFID technology.

For example, the RFID reader 310 designates a generally available standard RFID reader which can wirelessly read out the sensor data stored in the RFID transponder 200 (RFID sensor system).

The host system 320, for example, designates a system which is employed following the RFID reader and which further processes the data of the RFID reader, specifically the sensor data, and passes it on. A PC or a server (not subject matter of the invention) may serve as examples of a host system.

The information flow in FIG. 3 shows an example of the path taken by the sensor data from the RFID sensor system 200 to the evaluating host system 320.

Figure 4:
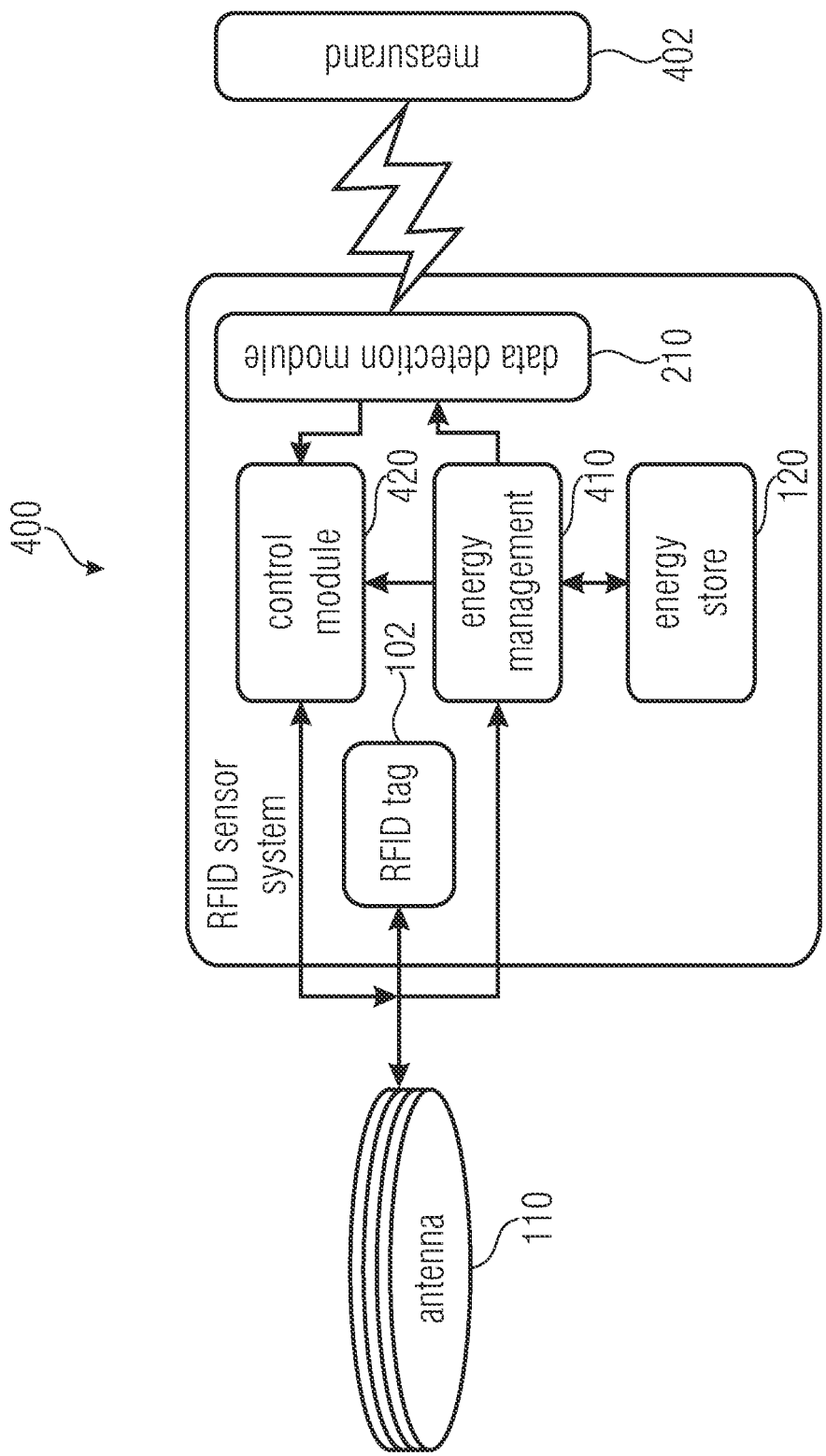
FIG. 4 shows a schematic representation of an architecture of an RFID sensor system.

The architecture of the RFID sensor system shall be addressed in slightly more detail at this point. To this end, FIG. 4 shows a schematic representation of an architecture of an RFID sensor system 400 in accordance with an embodiment of the invention. The RFID sensor system 400 includes an RFID component 102, an antenna 110, an energy store 120, a data detection module 210, an energy management device 410, and a control module 420. The RFID component 102 is connected to the antenna 110, to the energy management 410 and to the control module 420, the energy store 120 is connected to the energy management 410, the energy management 410 is connected to the control module 420 and to the data detection module 210, and the data detection module 210 is also connected to the control module 420. The antenna 110 is connected to the energy store 120 via the energy management 410 and may be used for charging the energy store 120. Additionally, the entire RFID sensor system 400 may be supplied with energy via the antenna 110 if a sufficiently strong alternating electromagnetic field is present at the location of the antenna 110. The data detection module 210 may detect one or more measurands 402.

The measurands 402 that have been detected may be provided to the RFID component 102 by the data detection module 210, for example directly or via the control module 420. To this end, the control module 420 may simulate a reader, for example, and thus store the measurands or processed measurands into the RFID component 102.

The RFID sensor system 400 consists of at least one antenna 110 and at least one RFID tag IC or RFID component 102. Taken together, the combination of the antenna 110 and the RFID tag IC 102 may result in a conventional standard RFID transponder which is available anywhere in this form. The energy for operating a conventional RFID transponder is obtained by the RFID transponder for example from the generated energy field of the RFID reader, i.e. the RFID transponder may not use any additional energy source.

In this example, an innovative feature results, e.g., from the extension of the present combination (the components constituted by the antenna and the RFID tag) by the components constituted by the control module, energy management, energy store and/or data detection module (e.g. sensors) into an RFID sensor system. One advantage of this architecture is, for example, utilization of a conventional standard RFID transponder which may be read out by conventional standard RFID readers and which enables a more varied range of applications due to the proposed extension by several components (control module, energy management, energy store, and data detection module, or sensors).

A conventional standard RFID transponder is often generally readable and writable only by an RFID reader (wireless), i.e. in many cases, only previous data that has been written into the transponder or RFID component may be read out again. Frequent utilization of RFID transponders may be found in logistics, for example.

The concept described may extend, e.g., utilization of conventional standard RFID transponders by incorporating the components constituted by control module, data detection module, energy management and/or energy store. Therefore, several new functionalities and advantages as compared to known concepts may result.

For example, data may automatically detected from at least one data detection module (e.g. humidity sensor and clock time). In addition, at least temporarily autonomous operation of the RFID sensor system is possible without utilization of external energy sources such as batteries. since the RFID sensor system is charged by the RFID reader or other energy sources. In addition, for example, the times when the data of the data detection units is to be fetched may be set. For example, air pressure once every hour, and temperature once every minute. Readout of the data (coming from the data detection module, or from sensors) may be effected using a conventional standard RFID reader when a conventional standard RFID tag IC or standard RFID component is employed. Moreover, flexible utilization of different data detection modules such as sensors or the like, which also differ in terms of the utilized interface (analog, digital (e.g. SPI)) with the control module, is possible. For example, simultaneous capturing of temperature sensor data (analog data), clock time (digital, SPI) and air pressure (digital, $I^2C$) may be effected. In addition, the RFID reader may poll the energy state of the RFID sensor system, for example, to determine the (remaining) duration of the autonomous operation of the RFID sensor system.

Figure 5:
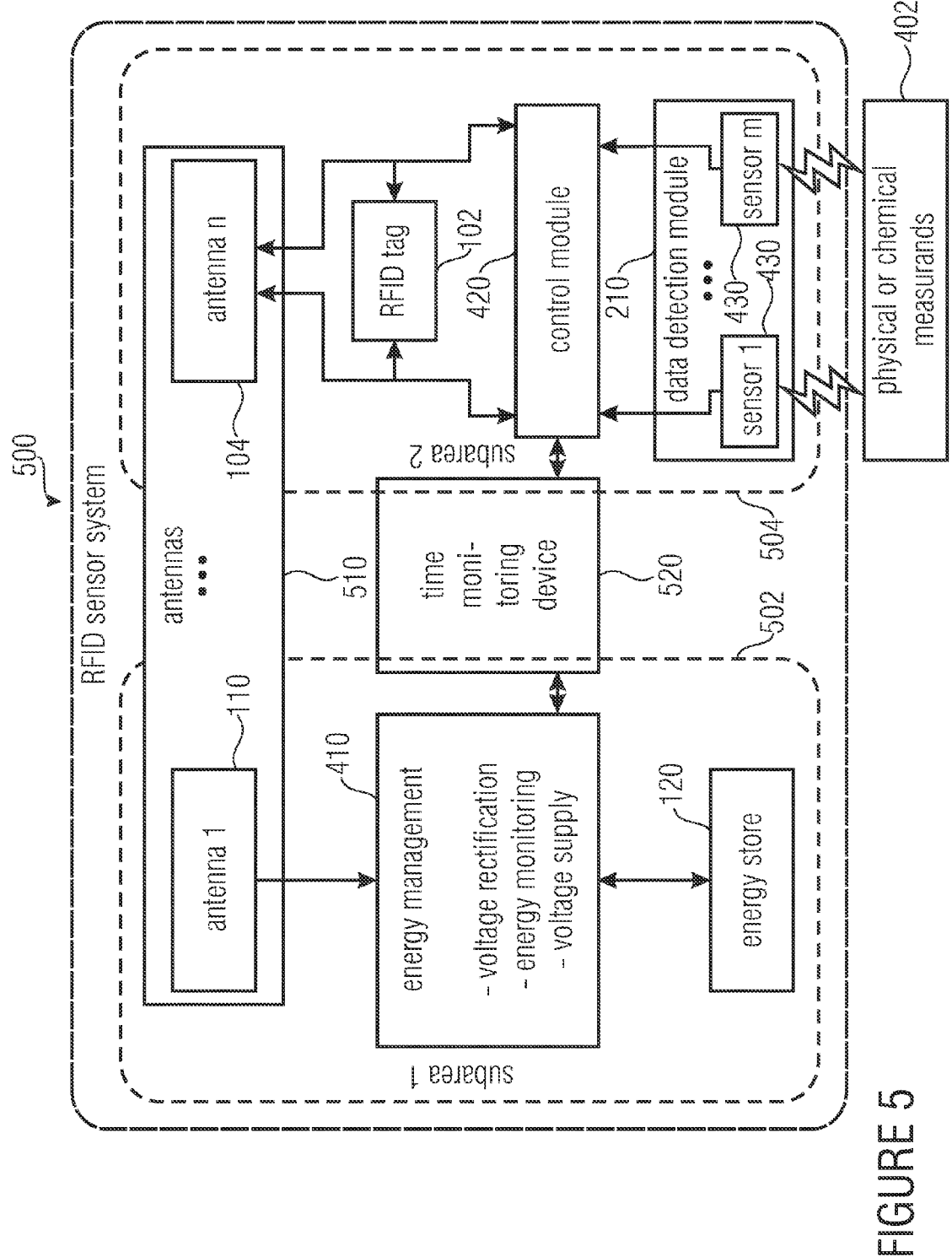
FIG. 5 shows a block diagram of subareas of an RFID sensor system.

FIG. 5 shows a block diagram of an RFID sensor system 500 in accordance with an embodiment of the invention. The RFID sensor system 500 includes an antenna module 510, an energy management 410, an energy store 120, an RFID component or RFID tag 102, a control module 420, a data detection module 210 and, optionally, a time monitoring device 520. The antenna module 520 is connected to the energy management device 410, to the RFID component 102 and to the control module 420, the energy management 410 is connected to the energy store 120 and to the optional time monitoring device 520, the control module is connected to the RFID component 102, to the optional time monitoring device 520 and to the data detection module 210. The antenna module 510 includes 1 to n antennas (such as are shown by reference numerals 104 and 110), which may be associated with the energy management 410 and the energy store 120 and/or the RFID component 102, the control module 420 and the data detection module 210. The data detection module 210 includes 1 to n sensors 430 and may detect one or more physical or chemical measurands 402.

Moreover, two subareas 502, 504 are marked in FIG. 5. Subarea 1 essentially includes the energy supply of the RFID sensor system, and subarea 2 includes, inter alia, the control module and the data detection module (sensors) as well as the RFID component 102.

In other words, subarea 1 includes, e.g., the principle of temporary operation of the system, i.e. intermediate memory of the energy from the charging operation (from the surrounding energy field of the RFID reader or other sources) and provision of energy for the temporarily autonomous operation of the RFID sensor system.

For example, subarea 2 includes the architecture of the RFID sensor system in terms of information-related technology. This is about the data flow of the data from the data detection units, or of the sensor data, up to storing it, e.g., into one or more conventional standardized RFID tags of the system.

Optionally, the RFID sensor system 500 may comprise a time monitoring device 520. The time monitoring device 520 may determine, e.g., the point(s) in time at which one or more measurands 402 are to be detected. To this end, the time monitoring device 520 is connected to the energy management 410 and/or to the control module 420. For example, the energy management device 410 may take care to ensure that the time monitoring device 520 is permanently supplied with energy directly from the alternating electromagnetic field or with energy from the energy store if the alternating electromagnetic field has insufficient energy density. If a point in time is reached when a measurand 402 is to be detected, the time monitoring device 520 may activate—for example by a signal transmitted to the energy management device 410 and/or to the control module 420—energy supply of the RFID sensor system by means of the energy store 120, and detection of the measurand 402 on the part of a sensor 430 of the data detection module 210. The time monitoring device 520 may be part of the control module 420, of the energy management device 410, or may be a separate unit, as is shown in FIG. 5.

Figure 6:
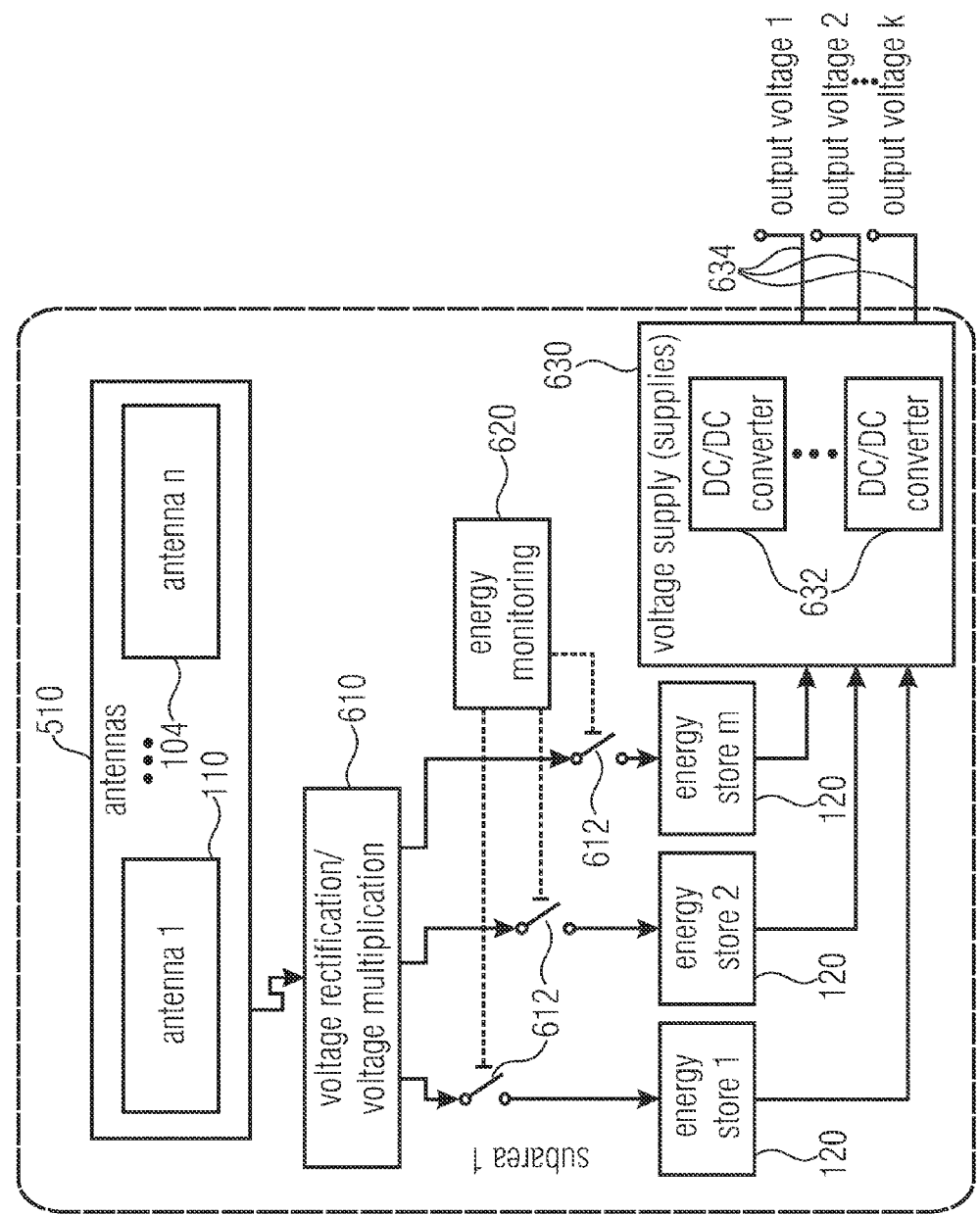
FIG. 6 shows a block diagram of an apparatus for supplying an RFID sensor system with energy.

In line with FIG. 5, FIG. 6 shows the subarea 502 for supplying the RFID sensor system 500 with energy (subarea 1) in a more detailed form. The figure shows the antenna module 510 with 1 to n antennas, a plurality of energy stores 120 (1 to m), as well as a voltage rectification and/or voltage multiplication 610, an energy monitoring device 620 and a voltage supply device 630 having one or more DC/DC converters 632 (direct current converters) and one or more voltage outputs 634 (output voltage 1 to k). The voltage rectification/voltage multiplication 610, the energy monitoring device 620 and the voltage supply device 630 may be part of the energy management device 410. The antenna module 510 is connected to the voltage rectification/voltage multiplication 610, the voltage rectification/voltage multiplication 610 is connected to the one or more energy stores 120, for example via one or more switches 612 that may be controlled by the energy monitoring 620, and the energy store(s) 120 is/are connected to the voltage supply device 630.

In other words, in this subarea 502 (subarea 1) of the RFID sensor system, the issue in this example is the energy supply of the system which temporarily operates in an autonomous manner so that the RFID sensor system can operate correctly for a defined (application-dependent) period of time.

The "energy supply" subarea may again be coarsely subdivided into two parts in this example. The first part includes one or more antennas (1 . . . n) via which the system may be supplied with energy, or be charged. The second part may be described as energy management and energy store. The components "energy management" and "energy store" include several fields of functions and/or modules.

By means of the voltage rectification/voltage multiplication 610, the current fed in via the antenna(s) may be rectified, so that the system has direct current voltage available to it. In this context, voltage multiplication circuits may also be used additionally. For example, it a dedicated voltage converter (DC/DC converter) is used for each energy store, efficiency can be increased. The energy monitoring 620 may permanently monitor the power available within the system. One the one hand, the module 620 may regulate the component "energy store 120" (energy store 1 . . . m), and on the other hand, energy state data (energy state parameters) may be provided, in this module 620, for storage within the RFID tag (which may be entered into the tag/RFID component with the aid of the control module), which may then communicate the energy state of the RFID sensor system to the reader. The energy store 120 may consist of at least one or more energy stores 1 to m, which may be switched on or off as a function of the energy state of the system. The dimensioning of the energy stores 120 may be effected as a function of the application, as may the number of energy stores. The module "energy monitoring" 620 may perform the switching on and off of the individual energy stores 120. The concept comprising several energy stores may facilitate putting into operation of the system to the effect that it will be in a standby mode more quickly since primarily, the relatively small energy stores may be charged first. The voltage supply or voltage supplies 630 may fall back on the existing energy stores 120 and may produce, for example, one or more constant output voltages 1 . . . k for the overall system. Generation of one or more output voltages may be effected in different ways. For example, in order to increase effectiveness with regard to exploitation of the energy within the energy stores, highly efficient DC/DC converters 632 may be employed which may generate, already from a low input voltage of e.g. less than 100 mV, a defined (mostly higher) operating voltage (e.g. 3.3 V). For example, there is the possibility of employing either a DC/DC converter for the sum of all energy stores, or to employ a separate DC/DC converter following each individual energy store. An advantage of this approach may be a higher energy yield being obtained from the respective energy stores. The DC/DC voltage converters may have high efficiency factors. As an example, a constant system voltage of 3.3 V is produced from voltages in the energy stores which range from 1.8 V to 5.5 V. For the voltage range of less than 1.8 V, a second DC/DC converter may be employed, for example, which may generate a constant output voltage of 3.3 V at input voltages of less than 100 mV to 1.8 V. This may serve to effectively exploit the energy store. A constant system voltage is important for the operation of the components, e.g. from the subarea 2 (data detection module, RFID component, etc.).

Due to the interaction of said above-mentioned modules for supplying the RFID sensor system with energy, the RFID sensor system may autonomously operate in a correct manner for a defined period of time, for example.

Figure 7:
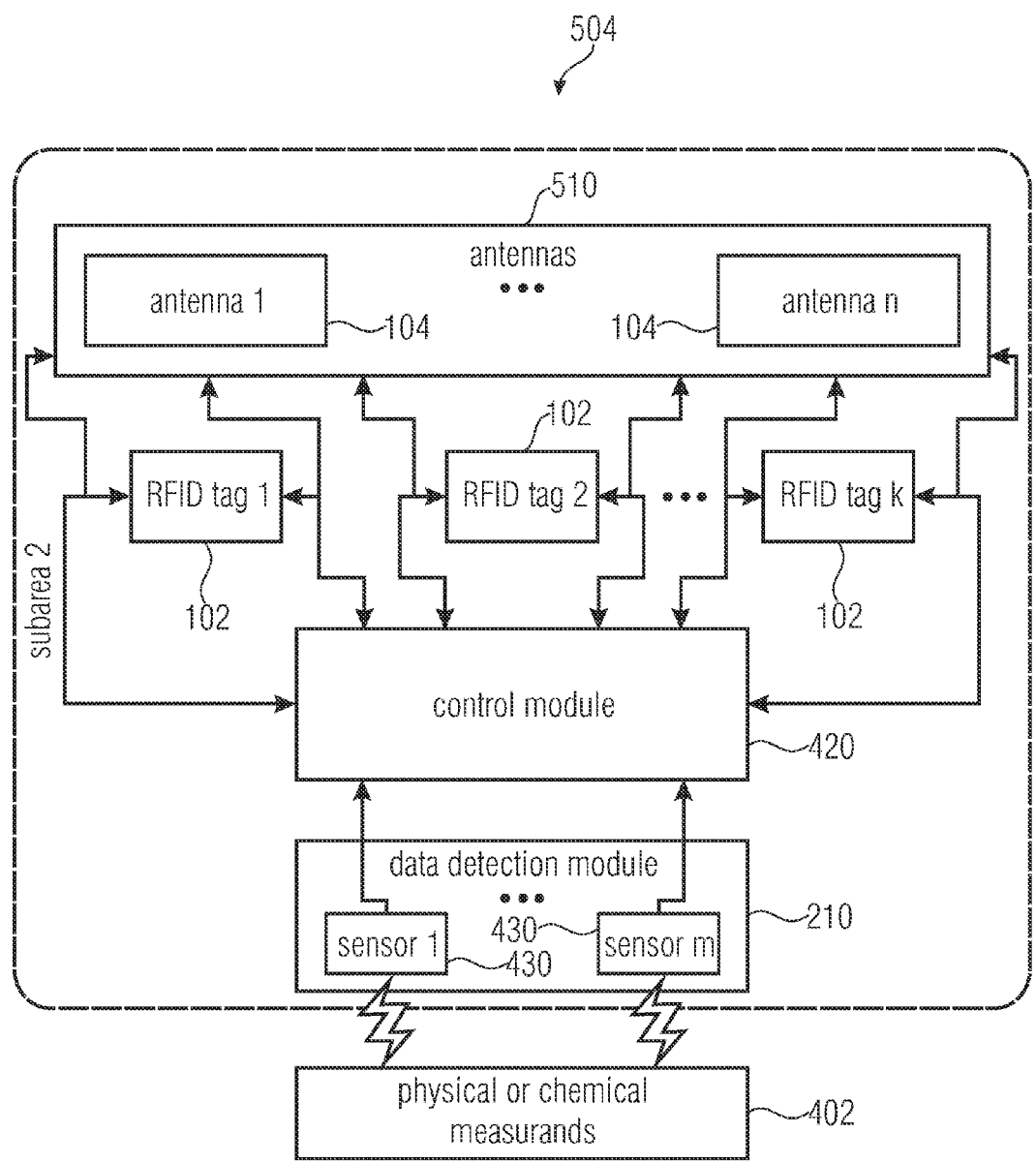
FIG. 7 shows a block diagram of a subarea of an RFID sensor system.

Also in line with FIG. 5, FIG. 7 shows the subarea 504, which includes the control module and the data detection module (sensor), among other things (subarea 2). The figure shows the antenna module 510 as having 1 to n antennas 104, one or more RFID components 102, the control module 420 and the data detection module 210 as having 1 to m sensors 430 for detecting one or more physical or chemical measurands 402. The 1 to n antennas 104 of the antenna module 510 may be the same as the 1 to n antennas of FIG. 6, or may be further antennas in addition to the antennas shown in FIG. 6. The data detection module 210 or every individual sensor 430 is connected to the control module 420, the control module 420 is connected to the one or more RFID components 102 and, optionally, to the 1 to n antennas or the antenna module 510, and the RFID components 102 are connected to the 1 to n antennas or the antenna module 510. For example, each RFID component 102 may be provided with an antenna 104 of its own.

In other words, this subarea (subarea 2) of the RFID sensor system is about methods concerning the aspects of information-related technology, among other things. What is at issue, for example, is the question of how the captured sensor data is polled, possibly preprocessed and stored in an intermediate memory before the (sensor) data subsequently arrives at a superordinated host system by means of a readout, for example with the help of an RFID reader.

In this subarea, for example, the control module may enable, on the one hand, writing to and reading conventional RFID tag ICs without using RFID readers and/or the RFID air interface, i.e. simultaneous modulation (data to the RFID tag IC) and demodulation (data from the RFID tag IC) of the data may take place. On the other hand, the control module may perform capturing and/or processing of the data of the data detection units connected.

The data detection module may include all of the data detection units (e.g. sensors) 1 . . . m of the RFID sensor system. Basically, any available sensor may be employed. The term sensor in this case is used, for example, to designate any system which outputs at least one value (e.g. analog, time-continuous, time-discrete or digital) at a specific point in time. The voltage supply of the sensors may be provided by subarea 1 (the energy supply). The control module may receive one or more values from one or more connected data detection modules (e.g. sensors). Said received values may be processed in the control module, which processing includes, for example, analog-to-digital conversion of an analog sensor value or capturing of a digital value. In addition, this module may control the connected RFID tags (ICs) 1 . . . k, i.e. the control module may be responsible for storing the (processed) data of the data detection units into the data memories of the RFID tags. The data describing the energy state of the RFID sensor system may also be written into one or more RFID tag ICs via the control module. Should the memory of the RFID tags be insufficient, for example since too large an amount of (sensor) data is available, the control module may take over the function of a temporary intermediate memory. Said intermediate memory may be emptied, and/or the data may be written into the RFID tag ICs as soon as the RFID tags have been read out by an RFID reader. Consequently, a method of (temporarily) storing (writing to and verifying by means of renewed readout) e.g. data from data detection units into conventional RFID tag ICs without including the air interface is possible. The RFID tag or the RFID component may be at least a conventional RFID tag (and/or IC). Said RFID tag represents, for example, the connection between the control module, and/or the data from the data detection module, and the RFID reader. Basically, any values may be stored into the RFID tags, e.g. via the control module. Via the antennas connected to the RFID tags, communication with an RFID reader and, thus, reading out and/or changing the values (by the reader) is possible. The antenna module consists of at least one antenna. Together with the RFID tags (ICs), said antennas may represent functional RFID transponders. The RFID tag ICs may be read out in a wireless manner by an RFID reader, for example with the help of said antennas. Thus, the determined (sensor) data of the data detection module may be wirelessly handed over to a superordinated system. In principle, one antenna is provided for each RFID tag IC; however, it is also feasible, for example, that while employing the same transmission principle, only one antenna may be used for several RFID tag ICs.

Figure 8:
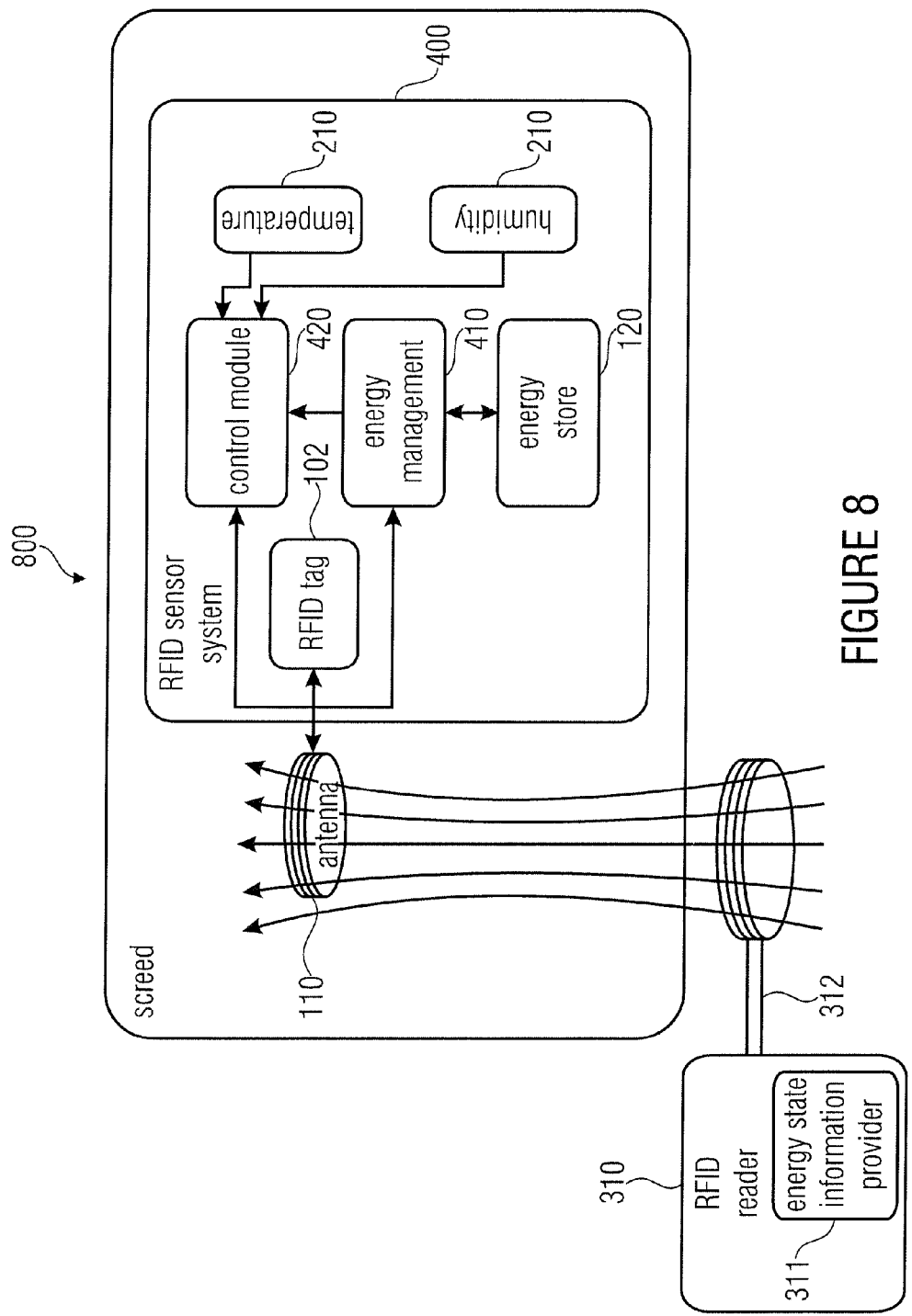
FIG. 8 shows a schematic representation of an application of an RFID sensor system.

FIG. 8 shows a schematic representation of an application 800 of an RFID sensor system 400 in accordance with an embodiment of the invention.

The figure shows an exemplary scenario for an application comprising the RFID sensor system 400. The RFID sensor system 400 is cast into liquid floor screed to determine the humidity and temperature of the screed over time. Findings about the correct drying phase of the screed may be derived therefrom. In this example, an inductively operating RFID transmission method is employed (e.g. load modulation/alternating magnetic field). In this configuration, the RFID sensor system 400 itself consists of an antenna 110 and an RFID tag IC 102 as well as of a temperature and humidity sensor 210, two energy stores 120 (capacitors), an energy management 410 and a control module 420. An exemplary progress of this scenario for the temporarily autonomous operation of the RFID sensor system 400 as well as for storage of the data within the transponder IC 102 without including the air interface will be described in the following.

An RFID reader 310 reads the sensor data (of the previous measurement time period) that is stored in the RFID transponder of the RFID sensor system.

Additionally, the RFID reader may determine the charge state (how much energy is still available) of the RFID sensor system (by reading out the RFID transponder of the RFID sensor system).

If the reader ascertains that the RFID sensor system has sufficient energy available to it for performing the task assigned to it, the reader can be removed and/or the (energy) field created by the reader may be switched off. If it is found that not enough energy is present within the RFID sensor system, the reader may continue to generate a field (an energy field) to charge the RFID sensor system. The energy fed in is stored within the RFID sensor system. By employing the charge control, the current state of the energy reservoir may be written into the RFID transponder of the RFID sensor system. The reader may read out said energy state parameter and ascertain whether the energy store is to be charged further.

In the event of sufficient energy, the reader may initiate the start of the RFID sensor system (data detection). The start of the data detection may just as well be automatically triggered in that a specific energy threshold is achieved, for example. The RFID sensor system may now operate autonomously (without any external energy supply). At predefined points in time, the sensor data (here temperature and humidity) may be polled, possibly preprocessed and temporarily stored. Storage is effected either directly, within the RFID transponder, or within the intermediate storage of the arithmetic unit (part of the control module) employed if the RFID transponder does not have sufficient memory space for all of the sensor data.

Depending on the frequency with which the sensor data and the current consumption of the sensors used are polled, the energy store of the RFID sensor system will accordingly empty more quickly or more slowly.

Subsequently, the RFID sensor system can be read out again by the reader.

Some embodiments in accordance with the invention relate to an apparatus for supplying an RFID component with energy. The apparatus includes an antenna, an energy store and an energy management device. The energy store stores energy induced into the antenna by an alternating electromagnetic field during a first time interval. In addition, the energy store supplies the RFID component with stored energy in order to maintain its functionality during a later, second time interval if an energy induced or coupled in by an alternating electromagnetic field during the later, second time interval is not sufficient for supplying the RFID component. The energy management device determines an energy state parameter of the energy store and provides the energy state parameter to the RFID component for storage or transmission to a receiver.

Some embodiments in accordance with the invention relate to an RFID reader for providing energy state information of an RFID component. The receiver comprises an energy state information provider 311 configured to provide the energy state information of the RFID component on the basis of an energy state parameter received by the RFID component.

Figure 9:
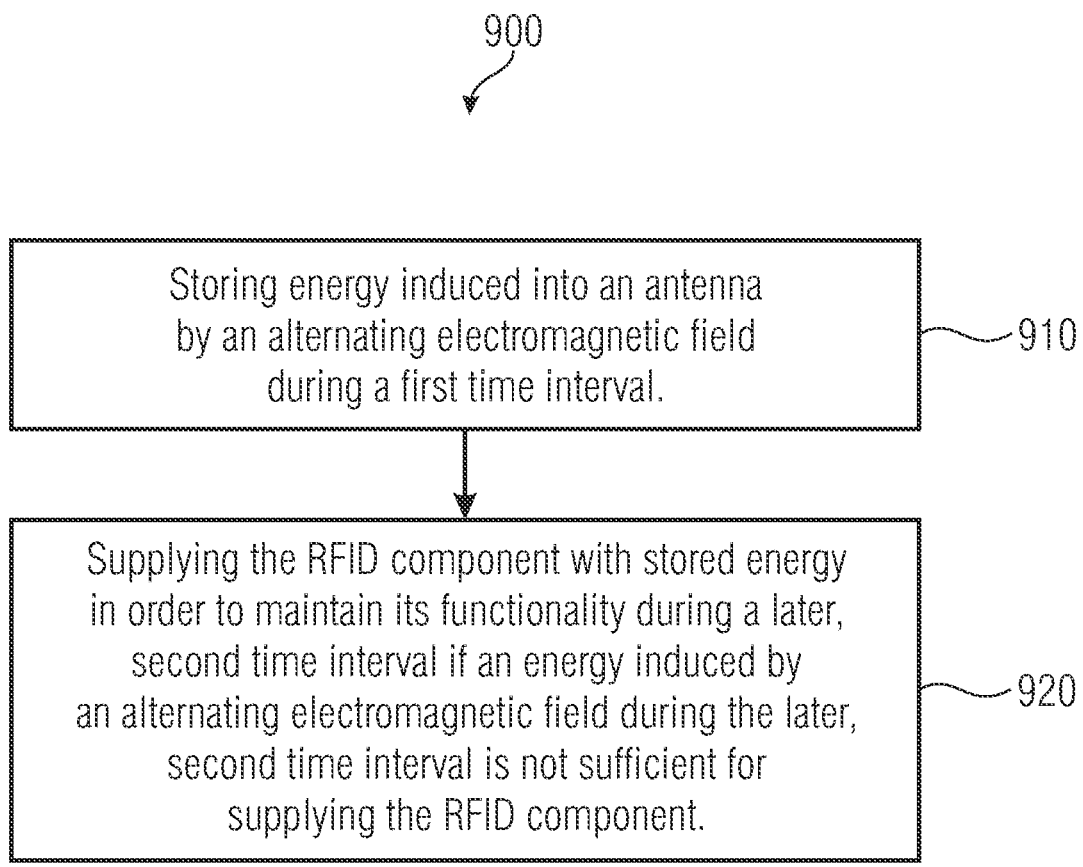
FIG. 9 shows a flowchart of a method of supplying an RFID component with energy.

FIG. 9 shows a flowchart of a method 900 for supplying an RFID component with energy in accordance with an embodiment of the invention. The method 900 includes storing 910 of energy and supplying 920 the RFID component with the energy stored. This includes storing 910 energy that is induced into an antenna by an alternating electromagnetic field during a first time interval. To maintain its functionality, the RFID component is supplied 920 with the stored energy during a later, second time interval if an energy induced by an alternating electromagnetic field during the later, second time interval is not sufficient for supplying the RFID component.

Figure 10:
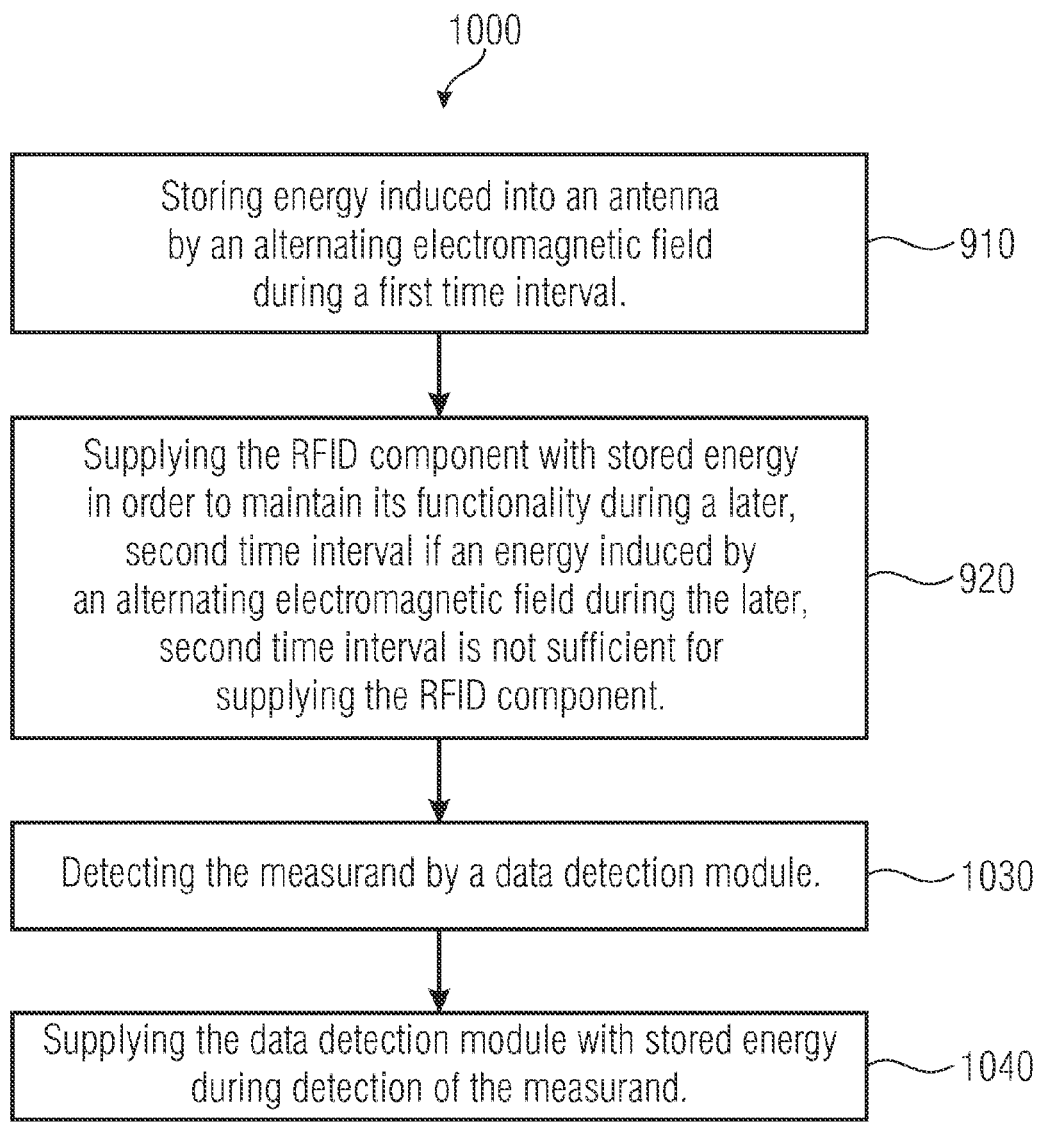
FIG. 10 shows a flowchart of a method of detecting a measurand.

FIG. 10 shows a flowchart of a method 1000 of detecting a measurand in accordance with an embodiment of the invention. The method 1000 includes storing 910 energy, providing 920 an RFID component with stored energy, detecting 1030 the measurand by means of a data detection module, and supplying 1040 the data detection module with stored energy during detection of the measurand. This includes storing 910 energy that is induced into an antenna by an alternating electromagnetic field during a first time interval. To maintain its functionality, the RFID component is supplied with stored energy during a later, second time interval if an energy induced by an alternating electromagnetic field during the later, second time interval is not sufficient for supplying the RFID component.

Some embodiments in accordance with the invention relate to a transponder which temporarily works in an autonomous manner or, in other words, they relate to methods and apparatus for energy management for temporary autonomous provision of energy for a transponder system (RFID component) and for storage of (sensor) data, e.g. into a conventional RFID transponder IC without including the air interface.

The concept described relates, e.g., to methods and apparatus for inductively or electromagnetically charging a transponder system or, as has been designated so far, an RFID sensor system, so as to enable temporal autonomous deterministic operation of one or more data detection units (e.g. sensors) and transmission of the captured data (e.g. sensor data) by means of RFID technology.

The methods and apparatus (RFID sensor system) described enable, for example, energy-autonomous operation of one or more data detection units (for example sensors) over a time period defined in an application-specific manner without utilization of external energy sources.

The (sensor) data is wirelessly transmitted to a superordinated system (e.g. an RFID reader and/or the host system connected thereto) by means of RFID technology while utilizing an RFID transponder (RFID component). The type of connection of the sensors or, more generally, of data detection units, is open, in principle, i.e. all potential transmission protocols may be integrated. Basically, there is also no limitation as to the type and number of sensors or data detection units.

As a result, utilization of external energy sources is not necessary, i.e. there will be no change of batteries, therefore utilization at difficult or inaccessible locations (e.g. cast into screed) is possible.

Utilization of customary standard RFID tags (including standard protocol) for data transmission to a standard RFID reader may be made possible.

Basically, any kind of sensor and/or data detection types may be integrated.

In principle, there is no limitation in terms of any specific number of sensors and/or data detection units.

There is fundamentally no restriction with regard to the type of connection of the sensors.

The measuring times may be specified in a deterministic manner and on an individual basis for each data detection unit.

The time period during which the system operates in a temporarily autonomous manner may be defined in an application-specific manner. In addition, the system offers the possibility of providing new services, and therefore forms a foundation for the emergence of new fields of application.

In some embodiments in accordance with the invention, contemplation of an entire system for detecting and transmitting (sensor) data includes several units.

The RFID sensor system can capture (sensor) data in a temporarily autonomous manner and (internally) write said data into the memories of one or more conventional standardized RFID transponders which may be read out by means of RFID technology.

The RFID reader, which may designate a generally available standard RFID reader, may wirelessly read out the sensor data stored in the RFID transponder (RFID sensor system).

The host system, which may designate a system used subsequently to the RFID reader, may further process and forward the data of the RFID reader, specifically the sensor data. A PC or a server may be mentioned as examples of a host system.

Generally, it shall be pointed out that, depending on the circumstances, the inventive scheme may also be implemented in software. Implementation may be effected on a digital storage medium, in particular a disc or a CD having electronically readable control signals which may cooperate with a programmable computer system such that the corresponding method is performed. Generally, the invention thus also consists in a computer program product having a program code, stored on a machine-readable carrier, for performing the inventive method when the computer program product runs on a computer. In other words, the invention may thus be realized as a computer program having a program code for performing the method when the computer program product runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for supplying an RFID component with energy, comprising:
   an antenna;
   an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component; and
   a control module configured to generate a carrier signal so as to provide an energy, which is provided by the energy store for supplying the RFID component, to the RFID component at an antenna interface of the RFID component on the basis of the generated carrier signal.

2. The apparatus as claimed in claim 1, wherein the alternating electromagnetic field in the first time interval may comprise a higher energy density at a location of the antenna than an energy density of the alternating magnetic field in the second time interval.

3. The apparatus as claimed in claim 1, wherein an energy density of the alternating electromagnetic field at a supply termination time falls below a supply threshold at which sufficient energy for supplying the RFID component is no longer induced, the supply termination time and a beginning of the second time interval being temporally spaced apart.

4. The apparatus as claimed in claim 1, comprising a further antenna, the RFID component being supplied, during the first time interval, by energy induced into the further antenna, and the RFID component being configured to transmit data to a receiver via the further antenna.

5. The apparatus as claimed in claim 1, comprising a time monitoring device configured to determine a starting time of the second time interval, the energy supply of the RFID component on the part of the energy store being activated on the basis of the determined starting time of the second time interval, and the energy store being configured to supply the time monitoring device with energy.

6. The apparatus as claimed in claim 5, wherein the data detection module is configured to perform detection of the measurand on the basis of the determined starting time of the second time interval.

7. An apparatus for supplying an RFID component with energy, comprising:
an antenna;
an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component; and
an energy management device configured to determine an energy state parameter of the energy store, and configured to provide the energy state parameter to the RFID component for storage or transmission to a receiver.

8. The apparatus as claimed in claim 7, wherein the energy management device is configured to activate supply of the RFID component by the energy store.

9. The apparatus as claimed in claim 7, wherein the energy management device is configured to supply the RFID component with energy via an antenna interface of the RFID component.

10. The apparatus as claimed in claim 7, comprising a plurality of energy stores, the energy management device comprising a shared voltage converter for the plurality of energy stores or comprising one voltage converter for each energy store of the plurality of energy stores.

11. The apparatus as claimed in claim 7, comprising a control module configured to control storage of the energy state parameter into the RFID component.

12. An apparatus for detecting a measurand, comprising:
an RFID component;
an antenna;
an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component;
a data detection module configured to detect the measurand during the second time interval, and configured to provide the measurand to the RFID component for storage or transmission to a receiver, said energy store being configured to supply the data detection module with energy during the detection of the measurand; and
a control module configured to store the measurand into the RFID component via an antenna interface of the RFID component, or configured to generate a carrier signal so as to provide an energy, which is provided by the energy store for supplying the RFID component, to the RFID component at an antenna interface of the RFID component on the basis of the generated carrier signal.

13. The apparatus as claimed in claim 12, wherein the control module is configured to control storage of the detected measurand into the RFID component.

14. The apparatus as claimed in claim 13, wherein the control module is configured to store the detected measurand or an energy state parameter and to provide same to the RFID component at a later point in time for storage or transmission to the receiver.

15. The apparatus as claimed in claim 13, wherein the control module is configured to process the detected measurand to achieve a processed measurand, and is configured to provide the processed measurand to the RFID component for storage or transmission to the receiver.

16. The apparatus as claimed in claim 12, wherein the RFID component is configured to transmit the detected measurand to the receiver during a transmission time interval, the energy induced by the alternating electromagnetic field being sufficient, during the transmission time interval, to supply the RFID component, and the energy store being configured to store energy that is induced during the transmission time interval.

17. An apparatus for detecting a measurand, comprising:
an RFID component;
an antenna;
an energy store configured to store energy induced into the antenna by an alternating electromagnetic field during a first time interval, and configured to supply the RFID component with stored energy in order to maintain its functionality during a later, second time interval if an energy induced by an alternating electromagnetic field during the later, second time interval is not sufficient for supplying the RFID component;
a data detection module configured to detect the measurand during the second time interval, and configured to provide the measurand to the RFID component for storage or transmission to a receiver, said energy store being configured to supply the data detection module with energy during the detection of the measurand; and
an energy management device configured to determine an energy state parameter of the energy store, and configured to provide the energy state parameter to the RFID component for storage or transmission to a receiver.

18. A method of supplying an RFID component with energy, comprising:
storing energy induced into an antenna by an alternating electromagnetic field during a first time interval;
generating a carrier signal so as to provide stored energy to the RFID component at an antenna interface of the RFID component on the basis of the generated carrier signal; and
supplying the RFID component with stored energy in order to maintain its functionality during a later, second time interval if an energy induced by an alternating electromagnetic field during the later, second time interval is not sufficient for supplying the RFID component.

19. A method of supplying an RFID component with energy, comprising:
storing energy induced into an antenna by an alternating electromagnetic field during a first time interval;
supplying the RFID component with stored energy in order to maintain its functionality during a later, second time interval if an energy induced by an alternating electromagnetic field during the later, second time interval is not sufficient for supplying the RFID component;
determining an energy state parameter of the energy store; and
providing the energy state parameter to the RFID component for storage or transmission to a receiver.

20. A method of detecting a measurand, comprising:
storing energy induced into an antenna by an alternating electromagnetic field during a first time interval;
supplying the RFID component with stored energy in order to maintain its functionality during a later, second time interval if an energy induced by an alternating electromagnetic field during the later, second time interval is not sufficient for supplying the RFID component;
detecting the measurand by means of a data detection module;
providing the data detection module with stored energy during the detection of the measurand; and
storing the measurand into the RFID component via an antenna interface of the RFID component, or generating a carrier signal so as to provide stored energy to the RFID component at an antenna interface of the RFID component on the basis of the generated carrier signal.

21. The method as claimed in claim 20, further comprising:
storing the detected measurand into the RFID component via the antenna interface of the RFID component.

22. A method of detecting a measurand, comprising:
storing energy induced into an antenna by an alternating electromagnetic field during a first time interval;
supplying the RFID component with stored energy in order to maintain its functionality during a later, second time interval if an energy induced by an alternating electromagnetic field during the later, second time interval is not sufficient for supplying the RFID component;
detecting the measurand by means of a data detection module;
providing the data detection module with stored energy during the detection of the measurand;
determining an energy state parameter of the energy store; and
providing the energy state parameter to the RFID component for storage or transmission to a receiver.

23. A non-transitory computer readable medium including a computer program comprising a program code for performing, when the computer program runs on a computer or microcontroller, the method of supplying an RFID component with energy, said method comprising:
storing energy induced into an antenna by an alternating electromagnetic field during a first time interval;
generating a carrier signal so as to provide stored energy to the RFID component at an antenna interface of the RFID component on the basis of the generated carrier signal; and
supplying the RFID component with stored energy in order to maintain its functionality during a later, second time interval if an energy induced by an alternating electromagnetic field during the later, second time interval is not sufficient for supplying the RFID component.

24. A non-transitory computer readable medium including a computer program comprising a program code for performing, when the computer program runs on a computer or microcontroller, the method of supplying an RFID component with energy, said method comprising:
storing energy induced into an antenna by an alternating electromagnetic field during a first time interval;
supplying the RFID component with stored energy in order to maintain its functionality during a later, second time interval if an energy induced by an alternating electromagnetic field during the later, second time interval is not sufficient for supplying the RFID component;
determining an energy state parameter of the energy store; and
providing the energy state parameter to the RFID component for storage or transmission to a receiver.

25. A non-transitory computer readable medium including a computer program comprising a program code for performing, when the computer program runs on a computer or microcontroller, the method of detecting a measurand, said method comprising:
storing energy induced into an antenna by an alternating electromagnetic field during a first time interval;
supplying the RFID component with stored energy in order to maintain its functionality during a later, second time interval if an energy induced by an alternating electromagnetic field during the later, second time interval is not sufficient for supplying the RFID component;
detecting the measurand by means of a data detection module;
providing the data detection module with stored energy during the detection of the measurand; and
storing the measurand into the RFID component via an antenna interface of the RFID component, or generating a carrier signal so as to provide stored energy to the RFID component at the antenna interface of the RFID component on the basis of the generated carrier signal.

26. A non-transitory computer readable medium including a computer program comprising a program code for performing, when the computer program runs on a computer or microcontroller, the method of detecting a measurand, said method comprising:
storing energy induced into an antenna by an alternating electromagnetic field during a first time interval;
supplying the RFID component with stored energy in order to maintain its functionality during a later, second time interval if an energy induced by an alternating electromagnetic field during the later, second time interval is not sufficient for supplying the RFID component;
detecting the measurand by means of a data detection module;
providing the data detection module with stored energy during the detection of the measurand;
determining an energy state parameter of the energy store; and
providing the energy state parameter to the RFID component for storage or transmission to a receiver.

27. An RFID reader for providing energy state information of an RFID component, comprising:
an energy state information provider configured to provide the energy state information of the RFID component on the basis of an energy state parameter received by the RFID component;
wherein the energy state parameter reflects the state of charge or the energy remaining within an energy store of the RFID component.

28. An RFID reader for providing energy state information of an RFID component, comprising:
an energy state information provider configured to provide the energy state information of the RFID component on the basis of an energy state parameter received by the RFID component;
wherein the RFID reader is configured to ascertain, based on the energy state parameter, whether an energy store of the RFID component is to be charged further.

* * * * *